March 22, 1932.  M. D. GREEN  1,850,171
BOX LIDDER
Filed April 27, 1931
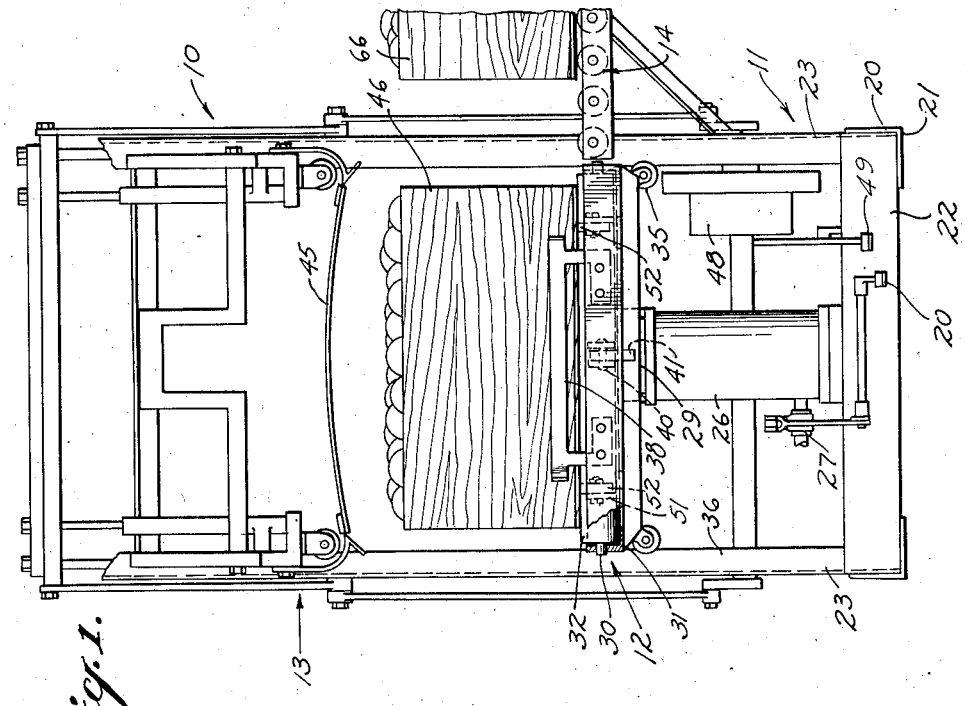
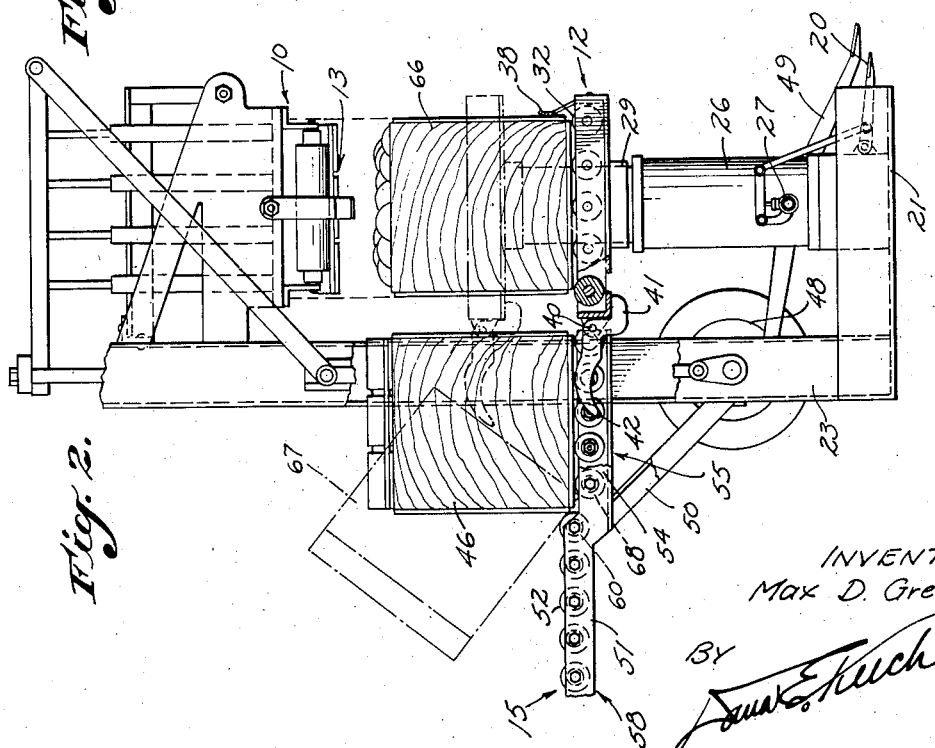
INVENTOR:
Max D. Green,
BY
ATTORNEY.

Patented Mar. 22, 1932

1,850,171

UNITED STATES PATENT OFFICE

MAX D. GREEN, OF SANGER, CALIFORNIA, ASSIGNOR TO HALE PAXTON, OF REDLANDS, CALIFORNIA

BOX LIDDER

Application filed April 27, 1931. Serial No. 533,136.

My invention relates to box handling devices, and particularly to such devices as are incorporated with machines for applying covers to shipping cases.

In certain fruit and vegetable shipping industries, the produce is packed for shipment in wooden boxes and collected from the packers on a conveyer which terminates at a lidding machine. This machine secures the lid to each case, and it is the custom to pack certain fruits and vegetables, such as oranges, apples and lettuce, with the fruit or vegetable extending upwardly above the top of the case so that when the lid is applied it is bowed upwardly. It thereupon becomes necessary to stack these cases laid on their sides in order to prevent the weight of upper cases crushing the fruit disposed under the bulge of the relatively light lids employed. At the present time these boxes are discharged from the lidder onto a conveyer leading to a shipping platform, and it is necessary for the boxes to be tilted on their sides manually, which consumes a considerable part of the time of the labor stacking these boxes.

It is accordingly an object of my invention to provide means incorporated with the box lidding machine, or similar apparatus, from which the boxes, after being lidded, will be discharged on their sides.

Certain lidding machines employ an elevating platform for lifting the packed box into contact with the lid to be applied thereto. It is another object of my invention to provide in a box lidding machine of this type a means for automatically utilizing the movement of the elevator to accomplish the delivery of the boxes from the machine on their sides.

The manner of accomplishing the foregoing objects, as well as further objects and advantages will be made manifest in the following description, together with the accompanying drawings, in which:

Fig. 1 is a front elevational view of a box lidding machine in which a preferred embodiment of my invention is incorporated.

Fig. 2 is an end elevation of Fig. 1.

Referring specifically to the drawings, a box lidding machine 10 is illustrated therein which includes a frame 11 on which is mounted an elevator 12 and a box lidding mechanism 13. The lidder 10 also has a box feeding conveyer 14 and a discharge conveyer 15.

The frame 11 includes a base 20 having foot members 21 connected by a heavy cross bar 22 and provided with upwardly extending channel posts 23.

The elevator 12 includes a hydraulic cylinder 26 mounted on the bar 22 having a control valve 27 actuated by a pedal 20. Slidably disposed in the hydraulic cylinder 26 is a piston 29 upon which is mounted a platform 30 including a frame 31 having a series of antifriction rollers 32 longitudinally mounted on this frame. The frame 31 is provided with double flanged rollers 35 which fit over webs 36 of the channel posts 23 so as to guide the platform 30 in its vertical movement. Also provided on the frame 31 is a guide 38 for a purpose which will be made manifest hereinafter.

Provided on a rear face of the frame 31 is a pair of lugs 40, between which is pivotally mounted a dog 41 as shown in Fig. 2. This dog has a downwardly inclined nose 42 for a purpose which will be made manifest hereinafter. The uppermost point on the dog 41 is disposed at a lower level than the rollers 32.

The box lidding mechanism 13 may be any suitable mechanism for applying and securing a lid 45 to a packed box 46 resting on the elevator 12 when, by the actuation of the elevator, this box is lifted into contact with the lidding mechanism. The lidding mechanism is adapted to be operated by a clutch 48 controlled by a foot pedal 49 in a manner well known in the art so that when the box 46 has been positioned upwardly against the mechanism 13 by depression of the pedal 28 the lidding mechanism 13 is caused to nail a lid 45 on the box 46 by depression of the pedal 49.

The platform 30 is shown in full lines in the drawings in its lower position.

The feeding conveyer 14 is supported in any suitable manner on substantially the same or a slightly higher level than that taken by the rollers 32 when the elevator 12 is in its lowermost position and is adapted to feed boxes endwise onto the right hand end of the elevator 12.

The discharge conveyer 15 may be supported in any manner desired, but one end of this is shown as supported on the frame 11 as by brackets 50. This conveyer is preferably formed of a plurality of angle irons 51 having skate wheels 52 rotatably mounted thereon. An open space is provided between right hand end portions 54 of the angle irons 51 so that the vertical movement of the dog 41 may not be obstructed by the conveyor 15. End portions 54 of the angle irons 51 are depressed slightly as shown in Fig. 2, these end portions 54 forming a primary section 55 of the discharge conveyer 15 which is of sufficient length to permit a lidded box to rest on this as shown in Fig. 2. The remainder of the discharge conveyer 15 may be referred to as its secondary section 58, the leading pair of rollers of which may be indicated by the numerals 60.

In operating the lidding machine 10, the elevator 12 is normally in its lower position and the box 46 is fed from the receiving conveyer 14 onto the elevator, as shown in Fig. 1. The pedal 28 is now depressed so that the elevator lifts the box 46 against the lidding mechanism 13, whereupon the pedal 49 is depressed, which causes the lidding mechanism 13 to nail a lid 45 to the box. Both pedals are now released and the elevator 12 returns rapidly to its lower position. The box 46 is now pushed over the rollers 32 onto the discharge conveyer section 55 and against the pair of rollers 60, as shown in Fig. 2. A second box 66 is now moved from the conveyer 14 onto the elevator 12 into the same position formerly occupied by the box 46. The pedal 28 is again depressed, causing the lifting of the box 66 for lidding in the same manner as above described for the box 46.

As the elevator starts upwardly the curved nose 42 of the dog 41 engages the bottom of the box 46 so that this is tilted into the broken line position 67 shown in Fig. 2, with the result that its center of gravity passes over the point at which the box is supported by rollers 60 and an adjacent pair of rollers 68 of the discharge conveyer section 55, this causing the box to fall onto the secondary discharge conveyer section 58 on its side.

It is thus seen that the ordinary operation of the elevator in the successive lidding of boxes discharged thereonto from the feeding conveyor 14 results in the lidded boxes fed onto the discharge conveyor 15 being tilted onto their sides so that it is unnecessary for the workmen stacking these boxes to manually tilt them after taking them from the discharge conveyer.

The pivoting of the dog 41 on the bracket arms 40 permits its arms to lift upwardly and pass over any object which might be resting upon the conveyor section 55 beneath this dog during the downward movement of the elevator 12.

While I have shown and described but a single embodiment of my invention, it is to be understood that various changes and modifications might be made in this without departing from the spirit of the invention or the scope of the appended claims.

What I claim is:

1. In a lidding machine, the combination of: a lidding mechanism; an elevator for lifting a box into operative relation with said mechanism; a discharge conveyor, an end portion of which is substantially on the same level as said elevator in its lower position, the balance of said discharge conveyor being at a higher elevation than said end portion; means actuated by said elevator for engaging a box on said end portion of said discharge conveyor and tilting said box on its side during a subsequent operation of said elevator.

2. In a box lidding machine, the combination of: a lidding mechanism; an elevator for lifting a box into operative position relative to said mechanism; a discharge conveyer leading away from a side of said elevator; and means actuated by said elevator for tilting a box which has just been lidded to a position on its side on said discharge conveyer during a subsequent lidding operation.

3. A combination as in claim 2 in which stop means is provided on said discharge conveyor limiting an initial movement of a box on said conveyor and maintaining it within the range of said tilting means.

4. In a box lidding machine, the combination of: a lidding mechanism; an elevator for lifting a box into operative position relative to said mechanism; a discharge conveyer leading from the rear side of said elevator from said machine; anti-friction means on said elevator adapted to facilitate movement of boxes sideways from said elevator onto said discharge conveyor; and means actuated by said elevator for tilting a box which has just been lidded to a position on its side on said discharge conveyor during a subsequent lidding operation.

5. In a machine for lidding boxes of fresh fruit in which the fruit extends above the top of the box, the combination of: lidding means including mechanism for handling a packed box having the fruit extending above the top thereof, mechanism for handling a lid, means for moving one of said mechanisms vertically toward the other to apply said lid to said box so that the lid will be bowed upward in the middle, and means for securing ends of said lid to said box; a box discharge conveyer substantially on the same level as said box handling mechanism; and means actuated by said moving mechanism during a lidding operation for tilting a box previously lidded, so that said box may be discharged from said lidding machine on its side on said discharge conveyer.

6. In a lidding machine, the combination of: a lidding mechanism; an elevator for receiving a box and lifting it into operative relation with said mechanism; a discharge conveyor for receiving boxes from said elevator; means for tilting a box just previously lidded on its side for movement on said discharge conveyor, said means being actuated by a subsequent operation of said elevator; and stop means provided on said discharge conveyor for limiting the initial movement of a lidded box thereon.

In testimony whereof, I have hereunto set my hand at Brawley, California, this 14th day of April, 1931.

MAX D. GREEN.